Feb. 1, 1938.                H. DREYFUS                    2,106,797
PRODUCTION OF CELLULOSE FROM LIGNOCELLULOSIC MATERIALS
Filed May 26, 1934
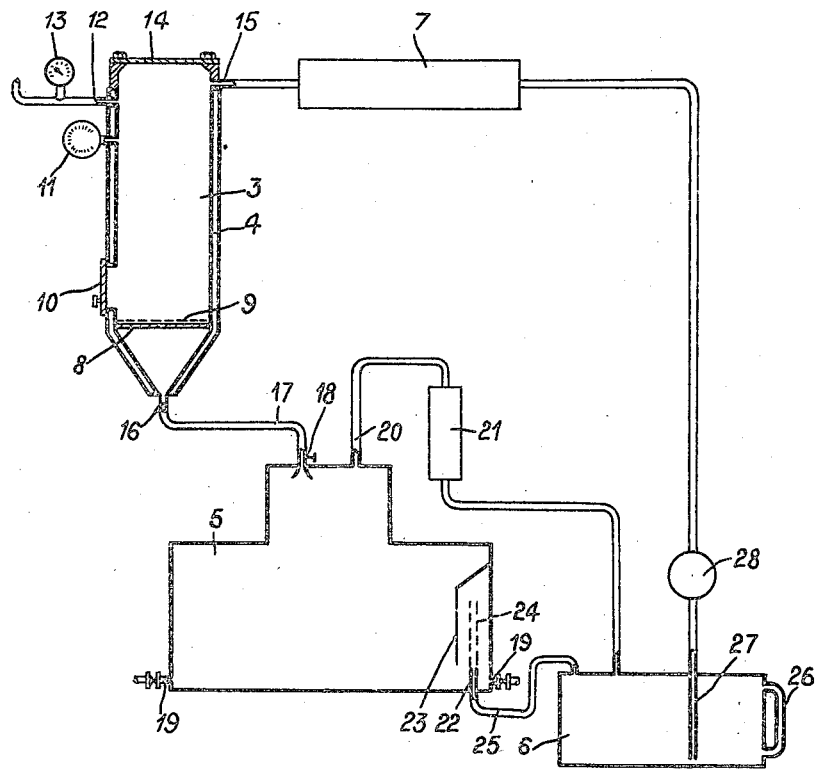
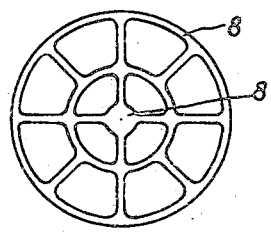
HENRY DREYFUS
INVENTOR
ATTORNEYS

UNITED STATES PATENT OFFICE 2,106,797

PRODUCTION OF CELLULOSE FROM LIGNO-CELLULOSIC MATERIALS

Henry Dreyfus, London, England

Application May 26, 1934, Serial No. 727,608
In Great Britain June 12, 1933

5 Claims. (Cl. 92—9)

This invention relates to the production of cellulose from lignocellulosic materials.

I have found that cellulose may be obtained from lignocellulosic materials in a particularly advantageous manner by treating the materials with organic solvents or solvent mixtures or with aqueous solutions thereof, which solvent compositions are capable of dissolving lignin from the materials, in such a way that the lignin-containing solutions formed remain in contact with the materials for short periods only.

Solvents that may be used either alone or in admixture, for example with each other or with water, for the purposes of the invention are alcohols, poly-alcohols such as ethylene glycol, diethylene glycol or glycerol, or other organic compounds such as, for example, acetone, dioxane, or other solvents as described in U. S. application S. No. 713,308 filed 28th February, 1934, now Patent No. 2,070,585 of February 16, 1937. For example a solvent consisting of an aqueous ethyl alcohol solution containing between 20 and 75% of water, and especially between 40 and 60% of water may be employed.

The temperature at which the extraction of the lignin is effected may be, for example, between 100° and 250° C., depending on the nature of the extracting liquor and the other reaction conditions. Thus for instance when extracting wood with aqueous ethyl alcohol containing about 50% of water under a pressure not very greatly exceeding that produced by the solvent vapours, temperatures between about 170° and 220° C. may be used. The treatment may be effected under the pressure generated by the solvent or solvent composition at the temperature employed or pressures higher than this may be used; for example, nitrogen or other inert gas or vapour may be introduced into the reaction vessel at any desired pressure or any other method of producing pressure may be used as described in U. S. application S. No. 713,309 filed 28th February, 1934, now Patent 2,022,654, of December 3, 1935.

According to one method in which the invention may be carried into practice, the lignocellulosic material may be subjected to the action of the solvent or solvent composition intermittently for short periods. For example the solvent, preferably preheated to a temperature in the neighbourhood of that required for the extraction may be fed under pressure into an autoclave containing the materials and, after the desired time has elapsed, for example, after from 10 to 20 minutes, the liquor may be run off from the autoclave, the temperature of the liquor preferably being maintained so long as it is in contact with the materials. Fresh solvent may then be fed into the autoclave and the process may be repeated until the extraction of the lignin and other materials has proceeded substantially to completion or to any desired degree.

In a modification of this method of applying the invention the liquor on leaving the autoclave may be cooled, separated from the precipitated lignin and other substances and, preferably after being re-heated, returned to the autoclave either alone or in admixture with fresh solvent, if desired after removal of a portion of the used solvent. On the other hand, the liquor, preferably after separation of lignin and other substances, may be employed for the treatment of further quantities of material. Thus, for example, the process may be carried out by means of a battery of autoclaves, the liquor discharged from one autoclave being fed, preferably after cooling to precipitate lignin and re-heating, to the next, and so throughout the battery. Advantageously, a process involving the use of a battery of autoclaves as described may be operated so that the fresh solvent liquor is employed in an autoclave containing a practically pure cellulose, while the used liquor containing lignins and other substances is employed for the extraction of less purified and of previously untreated materials.

In another method of carrying the invention into practice the materials may be subjected to an uninterrupted treatment with the solvent or solvent composition under the desired temperature and pressure conditions. For example the solvent or solvent composition may be continuously in contact with the materials and may be caused to flow therethrough continuously or at intervals, for instance of between 5 and 20 minutes. As when an intermittent process is employed the liquor may be caused to pass successively through a number of vessels, and is preferably cooled between the said vessels in order to remove a proportion of the lignin which it contains. Alternatively, the liquor may be re-circulated after removal of lignin through the same vessel, either alone or in admixture with a proportion of fresh solvent.

When the liquor is to be circulated continuously through the material the latter may be maintained in position in such a way as to allow passage of the liquor therethrough, for instance by means of a well supported filter cloth or set of filter cloths or upon a gravel or other filter bed or on a wire fabric which may for instance be similar to the "wire" employed in a Fourdrinier paper making machine. The mesh of such a "wire" should be sufficiently fine to prevent substantial loss of the lignocellulosic material by leakage at any stage in the treatment and will thus depend on the size of the material, the pressure employed, the degree to which the treatment is to be carried, etc. The "wire" or other supporting medium should also be heavy enough and/or well enough supported to withstand the pressure applied to the materials during the treatment. In carrying out such a process the pressure on the solvent composition in contact with the materials should be higher than that on the other side of the wire or other filtering means so as to assist the passage of the liquor through the materials. The desired excess pressure may for example be obtained by means of pumps or hydraulic rams or by pressure of air or other gases on the liquor, or the difference in pressure between the two sides of the filtering means may be obtained by a difference in temperature between the solutions on the two sides thereof.

As already indicated, a continuous treatment of the materials may be effected by circulating the solvent composition continuously through the materials under pressure and at the required temperature, preferably cooling the solvent between each passage through the materials. Such treatment may take place in a tower or other vessel across which is placed a "wire" or other suitable support for the lignocellulosic material. The tower may be jacketed or other means may be provided for heating and cooling the contents thereof as required. The "wire" may be in the form of a flat partition across the tower or vessel or it may be basket or funnel shaped or of any other convenient form whereby an efficient penetration of the cellulosic material by the extracting liquor is attained. The liquor running through the mass of lignocellulosic material into the lower part of the tower or vessel may be returned to the upper part, either directly or through a cooling vessel and/or a storage tank, for example, by means of a pump.

In another means of applying the invention the cellulosic material may be held between two "wires" or the like and the solvent composition caused to flow alternately in opposite directions therethrough. Such a process may, for example, be carried out in a horizontal tubular vessel containing two vertical partitions such as "wires" between which the cellulosic material is more or less tightly packed. The liquor may then advantageously be contained in two storage tanks each capable of being connected to a source of pressure, such as compressed air or nitrogen. By alternating the pressures in the two storage tanks the solvent composition may be forced from one to the other in opposite directions through the lignocellulosic material alternately.

Whatever the method employed provision may be made for the addition of fresh supplies of liquor or of solid materials during the progress of an extraction treatment. If desired also means may be provided for the addition and/or removal of cellulosic materials without interrupting the process.

In all cases it is preferable, as already indicated, to effect a separation of lignin and other substances between each use of the solvent, and such separation may advantageously be effected by cooling the solution leaving an autoclave or other vessel, for example at least partially by heat exchange with the solvent composition entering the same or another autoclave or vessel and/or by releasing the pressure on the solution. If desired, a more rigorous purification may be effected by distillation of the solvent or solvent composition from the materials dissolved therein, and such a purification may be effected at intervals, for example when working as above described with a battery of autoclaves in order to obtain solvent free from lignin and other substances wherewith the material in the end units of such a battery or other practically completely extracted material may be treated. For instance, when a battery of autoclaves is employed, a substantially pure solvent composition may be fed into the autoclave containing the purest cellulose, and the composition may be passed through the battery (being cooled between each extraction); after leaving the autoclave containing previously untreated material the solvent composition may be cooled and then distilled or may be distilled without being first cooled, and the distillate may be returned to the other end of the battery.

Apparatus in which the process of the invention may be carried out is illustrated in Figs. 1 and 2. Fig. 1 is a diagrammatic view of the apparatus as a whole and Fig. 2 is a plan view of a supporting element.

The apparatus consists essentially of an extraction tower 3 provided with heating jackets 4, a cooling and settling tank 5, a storage tank 6 and a heater 7. The extraction tower 3 is provided with an annular support 8 (Fig. 2) upon which rests a wire mesh 9, with a discharge opening 10 above the level of the wire mesh 9, with a temperature indicator 11, with an inlet 12 fitted with a pressure gauge 13 and leading to an air compressor, and with a pressure tight cover 14 whereby materials may be introduced into the tower on to the wire mesh 9. The tower 3 is also provided with a solvent inlet 15 and outlet 16. The outlet 16 leads via a pipe 17 and a valve 18 to the upper part of the settling and cooling chamber 5. This chamber is provided with discharge valves 19, with a vapour outlet 20 fitted with a condenser 21 leading to the storage tank 6, and with a liquid outlet 22 which is protected by a partition 23 and is fitted with a filter element 24. The outlet 22 leads via a pipe 25 to the storage vessel 6. This storage vessel is fitted with a level indicator 26 and with an outlet 27 connected to a pump 28 and thence through the heater 7 to the inlet 15 into the extraction tower 3.

The operation of the apparatus is as follows: Solvent composition is pumped by the pump 28 from the storage vessel 6 through the heater 7, where it is raised to the temperature at which the extraction is to be effected, to the extraction tower 3 containing the materials to be treated and also maintained at the temperature at which the extraction is to be carried out. The pressure on the solvent composition in the tower 3 is increased by means of the air compressor connected with the inlet 12 and the reaction conditions are adjusted by reference to the pressure gauge 13 and the temperature indicator 11. The solvent composition passing through the wire mesh 9 and the annular support 8 is carried by the pipe 17 through the valve 18 into the cooling and settling vessel 5. The pressure in this vessel is maintained at a value in the region of atmospheric pressure and the rate of flow of the solution into the vessel 5 is controlled by the valve 18. The sudden release of the pressure on the solution as it passes through the valve 18 into the cooling and settling vessel 5 causes a rapid vaporization of part of the solvent and consequent rapid cooling of the remainder of the solvent with precipitation of the lignin and other solid materials contained in the solution. The vaporized solvent passes through the outlet 20 to the condenser 21 where it is condensed and from whence it flows to the storage tank 6. The solvent composition remaining in the liquid form rises in the vessel 5 until it reaches the overflow level at the outlet 22 from whence it passes into the storage tank 6. The pump 28 is operated so that the level in the storage tank 6 remains approximately constant thus ensuring a regular circulation of the solvent composition through the lignocellulosic materials under the desired temperature and pressure conditions.

When the extraction is complete or substantially complete the circulation of the solvent composition is interrupted and the pressure in the extraction vessel 3 released. The cellulose may then be removed by the discharge opening 10 and the lignin-containing sludge in the cooling and settling vessel 5 withdrawn through the valves 19.

If desired two or more wire meshes and their supports may be employed; in such a case each mesh may be finer than that above it or if only two are employed, the lower may be finer than the upper; preferably discharge openings are provided whereby materials may be introduced onto or removed from each of the wire meshes.

The invention is not restricted as to the nature or shape of the vessel in which the extraction is carried out. Thus, although processes have been described in which the extraction is performed in autoclaves, towers or vessels of a tubular nature, other types of apparatus capable of withstanding the working pressure may be employed. For example, the materials may be carried in counter-current to the solvent composition through a tube or other vessel under the required temperature and pressure conditions. When autoclaves are employed these may be of any suitable design.

If desired, the extraction of the materials may follow a preliminary treatment with hot or boiling water or water under pressure or with dilute alkali solutions or dilute acid solutions, but such preliminary treatments may usually be dispensed with. The solvent may be employed in association with small quantities of acid or basic substances, for example hydrochloric or sulphuric acid or an organic acid such as formic acid or acetic acid or oxides or hydroxides of the alkali metals or the metals of the alkaline earths. Such acid or basic substances may advantageously be present in amount of .1% or less of the amount of the solvent.

The cellulose produced by the process of the invention may be employed, if desired after any further treatment, for any of the purposes for which cellulose is used, but it is especially valuable for use in esterification processes such as the manufacture of cellulose acetate. When it is to be employed for this purpose it may advantageously be subjected to a pretreatment, for example with dilute alkali followed by a treatment with an aliphatic acid as described in U. S. specification No. 1,711,110. It may, however, be employed with advantage in the manufacture of other cellulose derivatives such as cellulose ethers, cellulose nitrate or cellulose xanthate.

If desired, the formation of the pulp and any subsequent treatment preparatory to esterification or other reaction may be effected using the same vessel throughout. Thus, for example, the extraction may be effected in a horizontal extraction vessel containing two partitions, as already described, and when the action of the extracting liquor has proceeded as far as is desired, the pulp may be washed by a precisely similar process in which wash liquors are employed instead of the extracting liquor and may be subjected to an alkali treatment followed by acid treatment, it being simply necessary to provide containers for the various treating and washing fluids, together with the requisite connections to the extraction vessel, these connections being provided with valves whereby the desired containers can be connected to the vessel.

The term "true solvent compositions" as used hereinafter in the claims is to be construed as meaning solvents or mixtures of solvents which dissolve lignin, but do not enter into chemical combination therewith as do, for example, the phenols.

What I claim and desire to secure by Letters Patent is:—

1. Process for the production of cellulose from ligno-cellulosic materials, which comprises bringing an organic true solvent composition, capable of dissolving lignin from the materials, into contact with the materials at an elevated temperature, causing it to flow through the materials whereby lignin is dissolved out of the materials by the solvent composition, and removing from the materials the solution of lignin so formed after at most 20 minutes.

2. Process for the production of cellulose from ligno-cellulosic materials, which comprises bringing an organic true solvent composition, capable of dissolving lignin from the materials, into contact with the materials at an elevated temperature, causing it to flow through the materials whereby lignin is dissolved out of the materials by the solvent composition, removing from the materials the solution of lignin so formed after at most 20 minutes, cooling the solution, separating therefrom the lignin so precipitated, and again causing the solvent composition to flow through the ligno-cellulosic materials at an elevated temperature.

3. Process for the production of cellulose from ligno-cellulosic materials, which comprises bringing an organic true solvent composition, capable of dissolving lignin from the materials, into contact with the materials at an elevated temperature, causing it to flow through the materials whereby lignin is dissolved out of the materials by the solvent composition, removing from the materials the solution of lignin so formed after at most 20 minutes, cooling the solution, separating therefrom the lignin so precipitated, and causing the solvent composition to flow again through the same ligno-cellulosic materials at an elevated temperature.

4. Process for the production of cellulose from ligno-cellulosic materials, which comprises bringing an organic true solvent composition, capable of dissolving lignin from the materials, into contact with the materials at an elevated temperature, causing it to flow at intervals through the materials whereby lignin is dissolved out of the materials by the solvent composition, removing from the materials the solution of lignin so formed after at most 20 minutes, cooling the solution, separating therefrom the lignin so precipitated and causing the solvent composition to flow again through the ligno-cellulosic materials at an elevated temperature.

5. Process for the production of cellulose from ligno-cellulosic materials, which comprises bringing an organic true solvent composition, capable of dissolving lignin from the materials, into contact with the materials at an elevated temperature, causing it to flow through the materials whereby lignin is dissolved out of the materials by the solvent composition, removing from the materials the solution of lignin so formed after at most 20 minutes, cooling the solution, separating therefrom the lignin so precipitated, and causing the solvent composition to flow through a further batch of ligno-cellulosic materials at an elevated temperature.

HENRY DREYFUS.